United States Patent
Pillote et al.

(10) Patent No.: US 7,084,609 B2
(45) Date of Patent: Aug. 1, 2006

(54) ALTERNATOR CONTROLLED RECTIFIER

(75) Inventors: Mark J. Pillote, Ann Arbor, MI (US); Frederick Shell, Detroit, MI (US); Alan F. Judge, Farmington Hills, MI (US)

(73) Assignee: Visteon Global Technologies, Inc., Van Buven Township, MI (US)

( * ) Notice: Subject to any disclaimer, the term of this patent is extended or adjusted under 35 U.S.C. 154(b) by 106 days.

(21) Appl. No.: 10/767,931

(22) Filed: Jan. 29, 2004

(65) Prior Publication Data

US 2005/0168196 A1    Aug. 4, 2005

(51) Int. Cl.
H02H 7/06 (2006.01)
H02H 7/08 (2006.01)
H02P 9/00 (2006.01)
H02P 11/00 (2006.01)
H02M 7/04 (2006.01)

(52) U.S. Cl. .......................... 322/28; 361/20; 361/31; 363/89

(58) Field of Classification Search .................. 322/28; 361/20, 31; 363/89
See application file for complete search history.

(56) References Cited

U.S. PATENT DOCUMENTS

| | | | | |
|---|---|---|---|---|
| 2,445,991 A | * | 7/1948 | Bedford | 322/19 |
| 4,039,926 A | * | 8/1977 | Steigerwald | 363/138 |
| 4,110,669 A | * | 8/1978 | Akamatsu | 318/700 |
| 4,309,751 A | * | 1/1982 | Okado | 363/138 |
| 4,403,280 A | * | 9/1983 | Okado | 363/96 |
| 4,585,983 A | * | 4/1986 | Cooper et al. | 318/723 |
| 4,625,160 A | | 11/1986 | Hucker | 322/32 |
| 4,782,241 A | * | 11/1988 | Baker et al. | 307/66 |
| 4,926,104 A | | 5/1990 | King et al. | 318/599 |
| 4,947,100 A | * | 8/1990 | Dhyanchand et al. | 322/10 |
| 5,013,929 A | * | 5/1991 | Dhyanchand | 290/31 |
| 5,015,941 A | * | 5/1991 | Dhyanchand | 322/10 |
| 5,168,416 A | * | 12/1992 | Bailey et al. | 361/31 |
| 5,245,495 A | * | 9/1993 | Bailey et al. | 361/23 |
| 5,309,081 A | * | 5/1994 | Shah et al. | 322/10 |
| 5,473,240 A | * | 12/1995 | Moreira | 318/801 |
| 5,512,811 A | | 4/1996 | Latos et al. | 322/10 |
| 5,528,445 A | * | 6/1996 | Cooke et al. | 361/20 |
| 5,572,417 A | * | 11/1996 | Vinciarelli et al. | 363/89 |
| 5,621,631 A | * | 4/1997 | Vinciarelli et al. | 363/89 |
| 5,642,021 A | | 6/1997 | Liang et al. | 318/146 |
| 5,663,631 A | | 9/1997 | Kajiura et al. | 322/29 |
| 5,694,311 A | | 12/1997 | Umeda et al. | 363/89 |

(Continued)

*Primary Examiner*—Darren Schuberg
*Assistant Examiner*—Pedro J. Cuevas
(74) *Attorney, Agent, or Firm*—Brinks Hofer Gilson & Lione

(57) ABSTRACT

A system and method for controlling the voltage output of an alternator is disclosed. The system includes an alternator having a rotor, which has a field winding, a stator having a plurality of phases, a rectifier bridge connected to the plurality of phases, at least one detection circuit connected to each of the plurality of phases, and a controller in communication with the at least one detection circuit and the rectifier bridge. The plurality of phases of the stator are magnetically coupled to the field winding. The rectifier bridge has a plurality of switches for rectifying the alternating current developed in the plurality of stator phases. The at least one detection circuit connected to each of the plurality of phases are used to sense a current reversal in each of the plurality of stator phases. The controller controls the operation of the plurality of switches when the reversal of the current has been sensed by the at least one detection circuit.

12 Claims, 3 Drawing Sheets

U.S. PATENT DOCUMENTS

| | | | |
|---|---|---|---|
| 5,719,484 A | 2/1998 | Taniguchi et al. | 322/20 |
| 5,719,486 A | 2/1998 | Taniguchi et al. | 322/28 |
| 5,726,558 A | 3/1998 | Umeda et al. | 322/27 |
| 5,726,559 A | 3/1998 | Taniguchi et al. | 322/34 |
| 5,726,872 A * | 3/1998 | Vinciarelli et al. | 363/89 |
| 5,731,731 A * | 3/1998 | Wilcox et al. | 327/403 |
| 5,739,677 A | 4/1998 | Tsutsui et al. | 322/25 |
| 5,742,498 A | 4/1998 | Taniguchi et al. | 363/145 |
| 5,793,167 A | 8/1998 | Liang et al. | 318/141 |
| 6,154,031 A * | 11/2000 | Hughes | 324/322 |
| 6,215,271 B1 | 4/2001 | Lerow et al. | 320/104 |
| 6,239,582 B1 * | 5/2001 | Buzan et al. | 322/20 |
| 6,239,996 B1 | 5/2001 | Perreault et al. | 363/89 |
| 6,346,797 B1 | 2/2002 | Perreault et al. | 322/29 |
| 6,353,307 B1 * | 3/2002 | Koelle et al. | 322/59 |
| 6,396,161 B1 | 5/2002 | Crecelius et al. | 290/36 R |
| 6,528,967 B1 | 3/2003 | Hallidy | 318/808 |
| 6,768,237 B1 * | 7/2004 | Schroedl | 310/114 |
| 6,801,441 B1 * | 10/2004 | Salama | 363/37 |
| 2002/0043954 A1 | 4/2002 | Hallidy | 318/727 |
| 2002/0089866 A1 | 7/2002 | Keim et al. | 363/89 |
| 2002/0176266 A1 | 11/2002 | Perreault et al. | 363/53 |

* cited by examiner

ALTERNATOR CONTROLLED RECTIFIER

TECHNICAL FIELD

The present invention relates to systems and methods for controlling alternators and to controlling the alternator's power generation at various operating speeds.

BACKGROUND OF THE INVENTION

Conventional alternating current generators or alternators may include a motor winding (the field winding), three-phase stator windings (i.e. Delta or Wye configured), and a three-phase full wave controlled rectifier bridge. In order to convert the alternating current (AC) generated in the stator windings to direct current (DC) a rectifier bridge is connected to the stator windings. The rotor of the alternator is connected to a vehicle engine which turns the rotor that holds the field winding. The rotation of the rotor and thus the field winding by the vehicle engine causes AC power to be induced in the stator windings. The power generated in the stator windings is typically three-phase power. The voltage generated in each of the phases is delivered to the full wave rectifier bridge where it is converted into DC power for delivery to the vehicle load (i.e. the battery and vehicle electrical system). A battery is connected in parallel with the outputs of the full wave rectifier bridge for delivering adequate power to the load when the field winding is not rotating or when the field winding is rotating too slowly to result in a voltage equal to the battery voltage. However, when the rotor and field winding rotate at a sufficient speed, a voltage is generated across the battery terminal that is greater than the battery voltage and the battery is recharged. In the case where the vehicle engine is idling, such that the field winding rotates at a less than sufficient speed, the output of the alternator may not be adequate to supply all the power required by the load. When this occurs, the alternator is no longer regulating the system voltage. The battery is being discharged as it attempts to supplement the alternator output to meet the power demand at the load. If this condition remains over an extended period of time, the battery will become completely discharged.

The most common way to control the output of the alternator during engine idling and providing extra power for delivery to the vehicle load is to increase the rotor field flux. This may be accomplished by increasing the current through the field winding. If a higher current is delivered through the field winding, a greater voltage will be induced in the stator windings and a higher output from the alternator will result as the engine idles and the rotor rotates at a slow speed. However, the amount of current that may be delivered to the field winding is limited by overheating concerns, as too much current flow through the field winding may cause the alternator to overheat.

Other prior art methods for obtaining an increased output from the alternator during engine idle is to maximize the power angle. The power angle is defined as the phase difference between the back EMF generated in the stator windings and the phase voltage output from the stator windings.

In a passive diode bridge (i.e., rectifier bridge where only diodes are used), the phase current and the phase voltage are forced to be in the same phase relationship. When the phase voltage and phase current are forced to be in the same phase relationship, it is not possible to achieve an optimal power angle such that the back EMF and the phase voltage are orthogonal. However, if the passive bridge is replaced by a controlled or active transistor bridge (i.e., a rectifier bridge where the diodes are replaced by transistor switches), the phase voltage may be allowed to lag the phase current. When the phase voltage is allowed to lag the phase current, the phase angle between the back EMF and the phase voltage may approach the optimal 90° mark. It is known that the power output of an alternator at idle speeds can be increased by 45–50% by optimizing the power angle towards 90° by advancing the phase angle of the phase voltage.

In a controlled rectifier bridge, the angle of the phase voltage can be controlled by turning the transistor switches on and off at selected times. If the angle of the back EMF is known, the angle of the phase voltage may be adjusted by the switches in the controlled rectifier bridge and a more optimal power angle may be introduced. Unfortunately, it is difficult to obtain a direct reading from the back EMF generated in the stator windings. Without a machine reference from the back EMF, the optimal phase angle for the phase voltages cannot be determined. Therefore, some method must be used to obtain an indication of phase angle of the back EMF before the phase voltage is shifted by the controlled rectifier bridge.

One prior art method utilizes a rotor position sensor to provide a back EMF reference. Another method requires a current sensor to determine the phase current. An adjustment of the angle between the phase current and the phase voltage affects the power angle. Still other methods monitor the third harmonic voltage at the neutral point of a Wye-wound alternator and switch the transistors based on voltage levels measured.

In yet another method, the voltage across the low side transistor is monitored to determine when the current reverses through the low side transistor. By knowing the speed of the alternator, the current reversal of the high side transistor may be inferred.

While the prior art methods achieve their intended purpose, there still is a need for new and improved systems and methods for controlling the voltage output of an alternator at varying engine speeds and especially at lower engine speeds.

SUMMARY

In an aspect of the present invention a system for controlling the voltage output of an alternator is provided. The system includes a rotor having a field winding, a stator having a plurality of phases, a rectifier bridge connected to the plurality of phases, at least one detection circuit connected to each of the plurality of phases, and a controller in communication with the at least one detection circuit and the rectifier bridge. The plurality of phases of the stator are magnetically coupled to the field winding. The rectifier bridge has a plurality of switches for rectifying the alternating current developed in the plurality of stator phases. The at least one detection circuit connected to each of the plurality of phases are used to sense a current reversal in each of the plurality of stator phases. The controller that is in communication with the at least one detection circuit and the rectifier bridge controls the operation of the plurality of switches when the reversal of the current has been sensed by the at least one detection circuit.

These and other aspects and advantages of the present invention will become apparent upon reading the following detailed description in combination with the accompanying drawings.

DETAILED DESCRIPTION OF THE INVENTION

Figure 1:
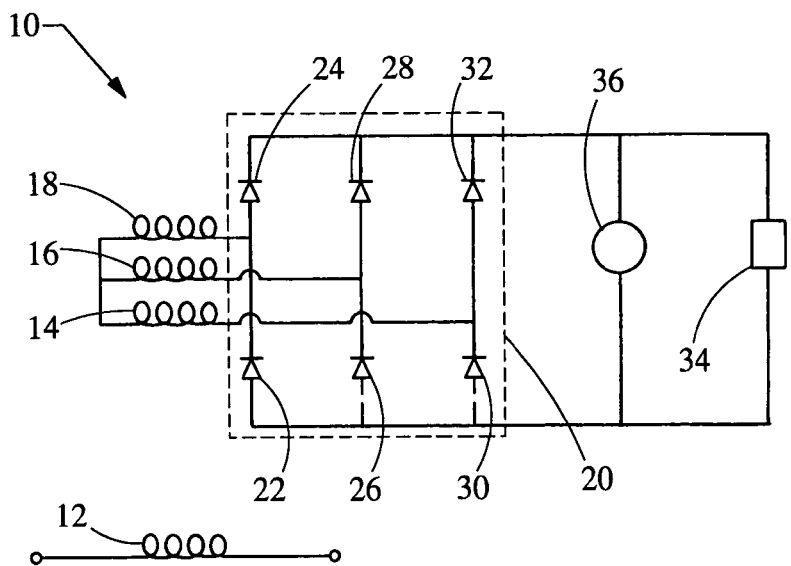
FIG. 1 is a schematic diagram illustrating a simplified model of a single stator phase within an alternator, in accordance with the present invention.

With reference to FIG. 1, a conventional alternator or alternating current generator 10 is shown schematically in order to provide a technical background for the alternator control method and system of an embodiment of the present invention. Alternator 10 includes a rotor (not shown) having a field winding 12, a stator (not shown) having stator windings or phases 14, 16 and 18 and a full wave rectifier bridge 20. The stator windings 14, 16, 18 may be Delta or Wye configured.

The full wave rectifier bridge 20 is connected to the stator windings 14, 16, 18 and includes a plurality of diodes 22, 24, 26, 28, 30, and 32. The rotor of alternator 10 is connected to a vehicle engine which rotates the rotor and thus field winding 12. The rotation of the field winding 12 causes AC power to be generated in each of the stator windings 14, 16 and 18. Thus, three-phase power is delivered to the full wave rectifier bridge 20 where it is converted into DC power. The DC power is then provided to a vehicle load 34. Further, a vehicle battery 36 is connected in parallel with the outputs of the full wave rectifier bridge 20. Thus, battery 36 delivers power to vehicle load 34 when the rotor is not rotating or when the rotor is rotating slowly resulting in a voltage equal to the battery voltage. At higher speeds of rotation of the rotor, a voltage results across the terminals of battery 36 that is greater than the battery voltage and battery 36 is recharged.

Figure 2:
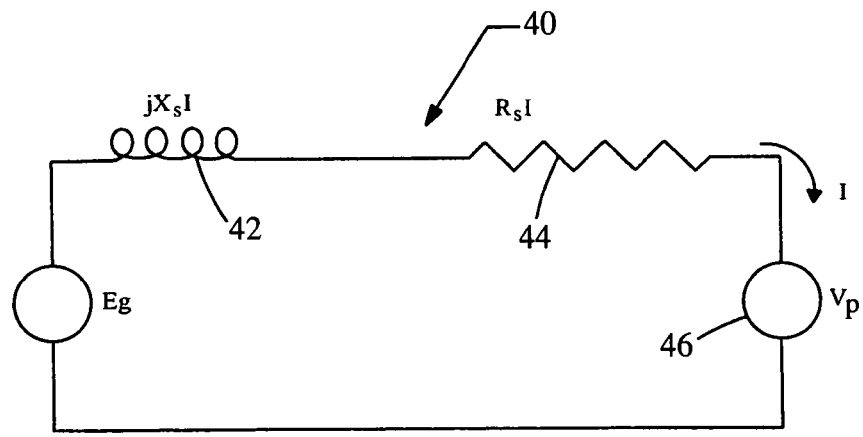
FIG. 2 is a phase diagram illustrating the relationship between the back EMF and the rectifier terminal voltage where the current is in phase with the phase voltage, in accordance with the present invention.

With reference now to FIGS. 1 and 2, a schematic diagram of a synchronous machine model 40 is illustrated in FIG. 2 to further provide a technical background for the alternator control method and system of an embodiment of the present invention. As shown in FIG. 2, a single phase of a typical three-phase alternator, as shown in FIG. 1, and used, for example, in automotive applications is represented by inductor coil 42. Inductor coil 42 has a stator phase reactance $X_s$, thus the voltage across coil 42 may be represented by $jX_sI$. Further, as represented in FIG. 2, Eg is the generated voltage, also known as the back electromagnetic force (EMF), generated in the phases of stator windings 14, 16, 18 by a rotating flux wave produced by the driven rotor which is magnetically coupled to the stator windings. A phase current I represents the alternating current (AC) prior to rectification. Vehicle load 34 typically includes, in a motor vehicle, the vehicle electrical wires, electrical components and other electrically operated devices (not shown). A resistor 44 is representative of the stator resistance having a value of $R_s$. A load 46 which includes, for this model, battery 36 and vehicle load 34 has a load voltage $V_P$ or rectifier terminal voltage.

Figure 3:
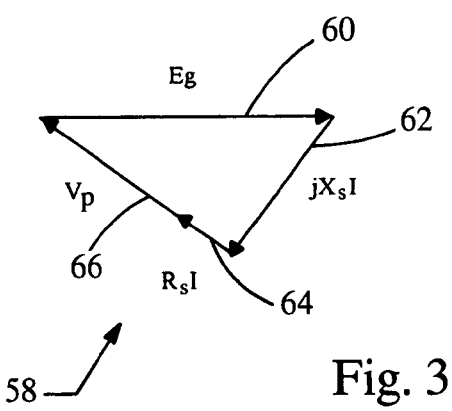
FIG. 3 is a phase diagram illustrating the relationship between the back EMF and the terminal voltage where the current is not in phase with the phase voltage, in accordance with the present invention.

Referring now to FIG. 3, a phase diagram 58 for the synchronous machine model 40 of FIG. 2 is illustrated. As dictated by KIRCHOFF'S VOLTAGE LAWS, the algebraic sum of the voltages in a closed loop electrical system must equal zero. As FIG. 3 illustrates, this is the case here. Further, the voltage values of the vectors are arbitrary and are for illustrative purposes only and do not represent real values for an alternator. As shown in FIG. 3, vector 60 represents the generated voltage Eg that is summed with the voltage ($jX_sI$) across stator phase 42, as represented by vector 62. Vector 62 is summed with the voltage ($R_sI$) across stator resistance 44, as represented by vector 64. Vector 64 is then summed with the voltage drop ($V_p$) across the rectifier terminal 46, as represented by vector 66.

FIG. 3 is representative of a diode type rectifier bridge (as shown in FIG. 1) where the reactive drop and the resistive drop are orthogonal to one another and the phase terminal voltage $V_p$ is in phase with the resistive voltage drop $R_sI$. Typically, the phase terminal voltage $V_p$ is what biases the diodes on and allows the current to flow.

Figure 4:
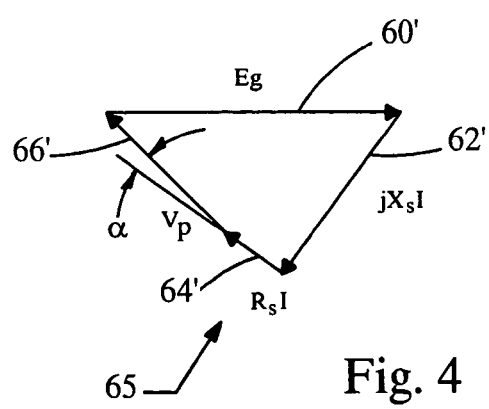
FIG. 4 is a schematic representation of a synchronous rectifier controlled bridge, in accordance with the present invention.

Referring now to FIG. 4, a phaser diagram 65 is provided to illustrate the effects of using a controlled switch instead of a diode in a rectifier bridge to control the phase relationship between the current I and the phase voltage $V_p$. A full wave controlled rectifier bridge using switches, instead of diodes, will be described below and illustrated in FIG. 5. As shown in FIG. 4, phase shifted terminal voltage $V_p$ as represented by vector 66' is, for example, 10° out of phase with the resistive drop $R_sI$, as represented by vector 64'. Further, the values of $R_s$ and $X_s$ have not changed, but the magnitude of the current I has changed. If the switch is on for 10° after current I reverses direction, the impedance of the stator phase is reduced dramatically. This causes current I to increase through the phase and charges up inductor 42.

Figure 5:
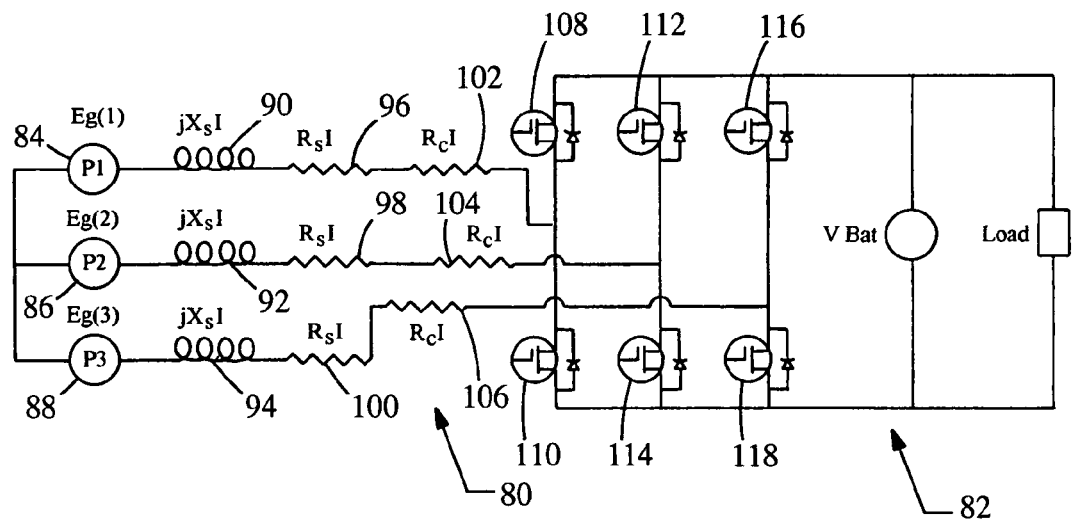
FIG. 5 is a schematic diagram illustrating a circuit for detecting current reversal, in accordance with the present invention.

Referring now to FIG. 5, a schematic diagram of a synchronous machine 80 having a controlled rectifier circuit 82 is illustrated, in accordance with the present invention. Rectifier circuit 82 is representative of a three-phase synchronous machine. The generated phase voltages $E_{g1}$, $E_{g2}$, and $E_{g3}$ are referenced by 84, 86 and 88. The reactance of the stator phases $X_{s1}$, $X_{s2}$, $X_{s3}$ is represented by inductors 90, 92, and 94. Stator wire resistances for each phase is represented by $R_{s1}$, $R_{s2}$, $R_{s3}$ and referenced at 96, 98 and 100. Further, as illustrated in FIG. 5, resistances $R_{c1}$, $R_{c2}$, $R_{c3}$ is represented as the internal resistances of the copper lead frame of rectifier circuit 82. The values of $R_{c1}$, $R_{c2}$, $R_{c3}$ for each of the phases need not be equal. The internal resistance $R_{c1}$, $R_{c2}$, $R_{c3}$ for rectifier circuit 82 for each of the phases is represented by resistors 102, 104 and 106.

With continuing reference to FIG. 5, switches 108, 110, 112, 114, 116 and 118 are provided in place of the diodes illustrated in FIG. 1. Thus, circuit 82 is a full wave controlled bridge circuit where the switches are, for example, field effect transistors (FET). Of course, other types of switches may be utilized as well. The operation of the switches may be independently controlled by a controller, microprocessor or the like. For example, if the low side switch 110 is energized and current is flowing from ground into stator phase 84, eventually the current will reverse direction. In a conventional alternator, as shown in FIG. 1, having a diode rectifier circuit, the low side diode 22 would reverse bias and the high side diode 24 would be energized at the point at which the phase current (I) reverses. This scenario is shown in FIG. 3 where the current (I) is in phase with the phase voltage. However, unlike the conventional diode rectifier bridge, controlled rectifier bridge circuit 82 may be utilized to control the phase relationship between current (I) and the phase voltage. For example, by controlling the operation of the switches, the resistive drop vector 64' may be brought out of phase with the terminal voltage $V_p$.

A delay of 10° for instance, as illustrated in FIG. 4 (or ⅟₃₆th of the period of the phase voltage), creates a larger $R_sI$ vector 64' and a larger $jX_sI$ vector 62'. However, the values of $R_s$ and $X_s$ have not changed, only the magnitude of the current (I) has changed. Vector 62' which represents the reactive drop is still orthogonal to vector 64' which represents the resistive drop. In this scenario, the low side switch 110 is energized for 10° after the current (I) reverses from a direction from ground into the stator phase 84 to a direction from the stator phase 84 to the ground, the impedance of the stator phase 84 is reduced dramatically. Consequently, the current (I) increases through the phase and charges the inductor. After the 10° firing delay, the low side switch 110 is opened and the high side switch 108 is closed. Thus, the stored energy in inductor 84 is discharged to load 34 through high side switch 108 increasing the output of the alternator. The high side switch 108 would also have a phase delay of 10° after current reversal. The value of a 10° phase delay is, of course, used for example purposes only. Experimental tests would have to be performed to determine the optimal delay for the alternator.

Figure 6:
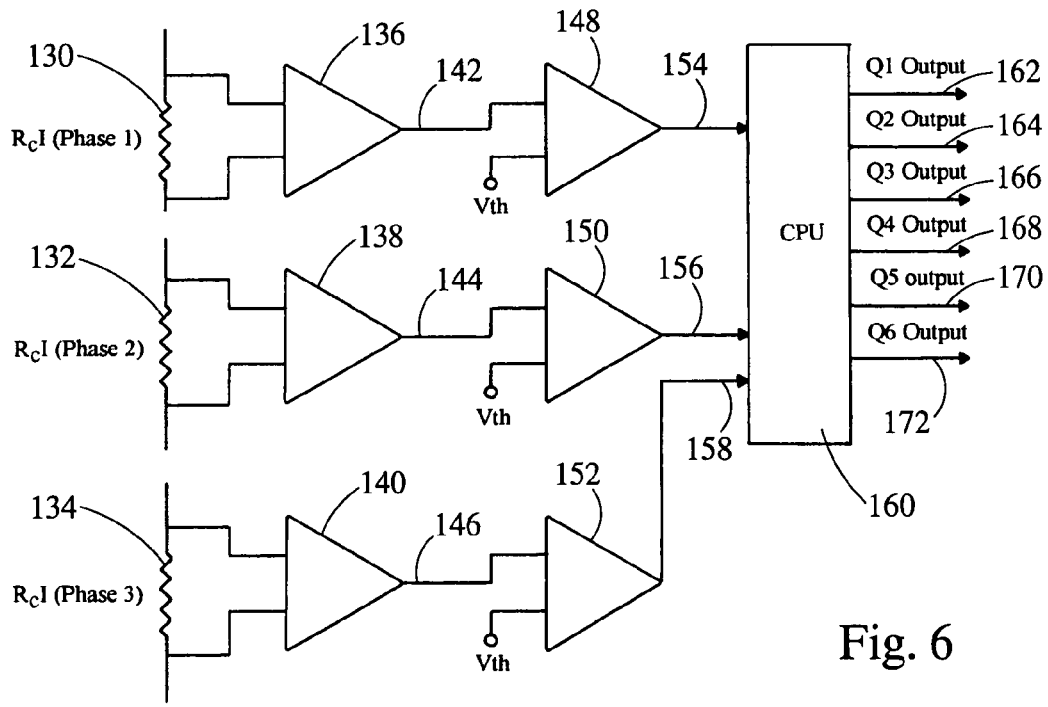
FIG. 6 is a flow chart illustrating a method for controlling a controlled rectifier bridge in an alternator, in accordance with the present invention.

Referring now to FIG. 6, a circuit is illustrated for detecting the internal resistance of a circuit board lead frame of the full wave controlled rectifier bridge circuit shown in FIG. 5. In an embodiment of the present invention a system and method provides for the detection of the current reversal in the stator phases in order to control the operation of the switches to optimize the power angle. To this end, the resistances $R_{c1}$, $R_{c2}$, $R_{c3}$, which represent the resistance of the copper lead frame, for each of the phases of a three-phase synchronous rectifier and referenced at 130, 132 and 134 are monitored. Differential operational amplifiers 136, 138 and 140 are utilized to measure the voltage drop across each of the resistors 130, 132 and 134. The amplifier outputs 142, 144 and 146 of each of the differential operational amplifiers 136, 138 and 140, respectively, are fed to comparator circuits 148, 150, 152 to determine when the current (I) in the lead frame reverses direction. For example, if the voltage is above a threshold voltage (Vth), than the comparator outputs 154, 156, and 158 is five volts. However, if the differential amplifier output is below Vth, then the comparator outputs are each zero volts, for example.

The resistance $R_c$ of the lead frame may be calculated by multiplying the resistivity constant of the material by the length of the track or trace of the lead frame and dividing that quantity by the cross-sectional area of the track or trace. The actual magnitude of the current (I) is not important, but could be determined by knowing the value of $R_c$.

A microprocessor 160 is provided in communication with comparator outputs 154, 156, and 158. Microprocessor 160 may be any processor or circuit that is capable of executing a control algorithm to determine the period of the signal and delay the firing of the switches by a predetermined phase delay after the operational amplifiers output a signals indicating when the current reversed.

The present invention contemplates using a single current detection circuit to detect the current reversal in a single phase of the alternator. The zero crossing (current reversal) of the other phases may be determined since it is known that they are 120 and 240 degrees out of phase with respect to the single phase being read.

With continued reference to FIG. 6, in operation, a differential voltage is read from each of the three sense resistors 130, 132 and 134. The differential amplifiers 136, 138 and 140 read the voltage differential across resistors 130, 132, 134 and amplify the differential voltage signal by a certain gain factor. Alternatively, a multistage amplifier circuit may be used to increase the overall gain of the signal without sacrificing bandwidth. The comparators 148, 150, and 152 are used to generate a TTL level signal for microprocessor 160. The period of the current (I) is identical to the period of the stator phase voltage. Thus, the firing delay of the switches may be calculated from the switching period of any one of the comparator outputs. The threshold voltage $V_{th}$ at the comparator stage is the reference voltage that indicates the zero crossing of the current. The inputs of the microprocessor 160 may be set to detect the rising and falling edge of the comparator output. A plurality of gate control signals 162, 164, 166, 168, 170 and 172 are used to control the operation of the switches based upon the comparator inputs and the microprocessor logic.

Figure 7:
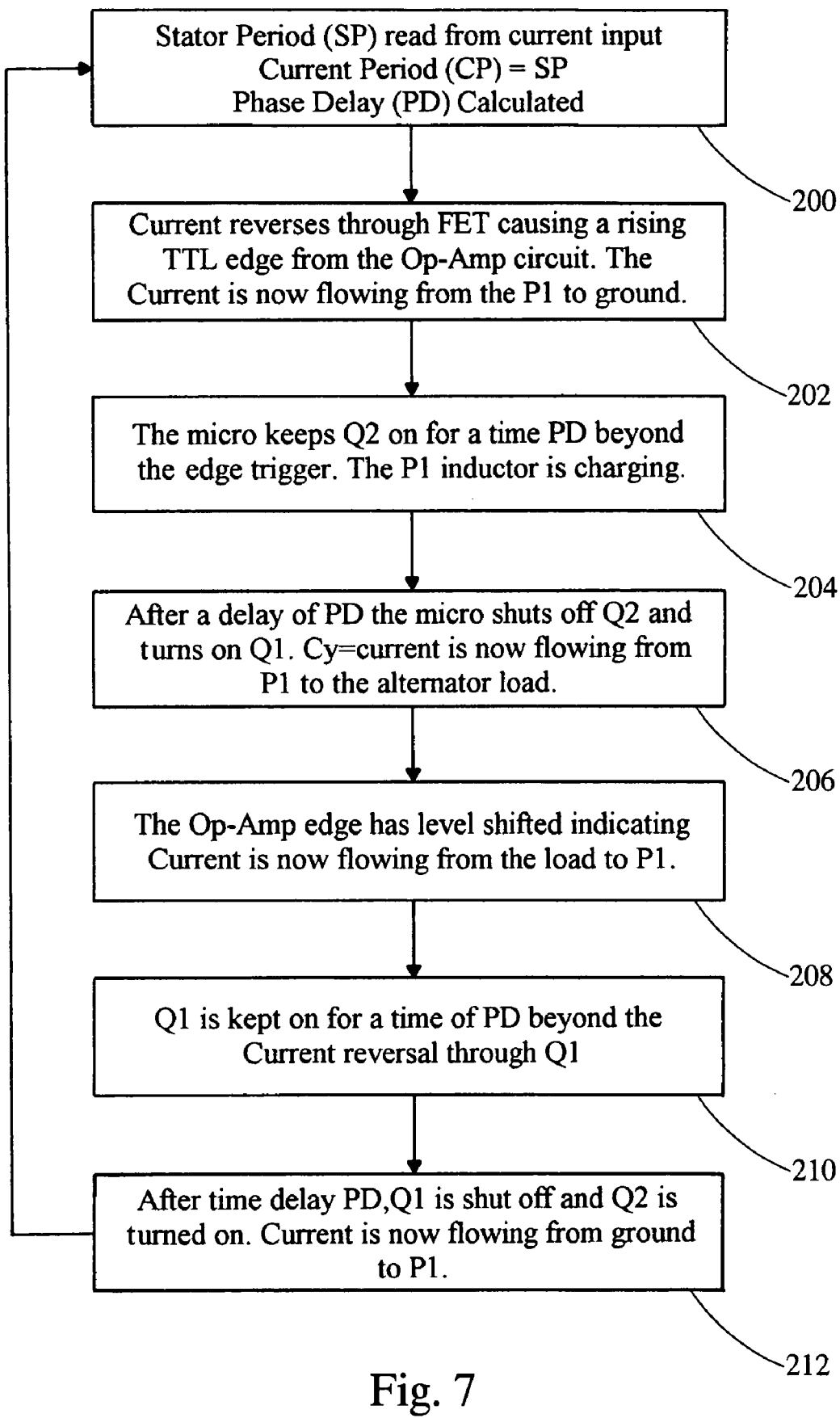
FIG. 7 is a block diagram illustrating how one phase of the alternator shown in FIG. 5 may be controlled.

Referring now to FIG. 7, a block diagram illustrating how one phase of the alternator shown in FIG. 5 may be controlled. Of course, the same control strategy could be applied to the other phases as well. The block diagram of FIG. 7 corresponds to only one phase of the alternator shown in FIG. 5. Further, it is assumed that the current (I) is initially flowing from ground into phase 84 and that switch 110 is on and switch 108 is off. At block 200, the stator period (SP) is read from the current input and the current period (CP) is set equal to SP. Further, the phase delay (PD) is calculated. At block 202, the current reverses through switch 110 causing a rising TTL edge output from comparator 148. The current is now flowing from phase 84 to ground. At block 204, microprocessor 160 keeps switch 108 on for a time PD beyond the edge trigger. At this point, the phase inductor is charging. At block 206, microprocessor 160 turns off switch 110 after a delay of PD and turns on switch 108. Current is now flowing from phase 84 to the alternator load. At block 208, the comparator edge has level shifted indicating that the current is now flowing form the load to phase 84. At block 210, FET 108 is kept on for a time of PD beyond the current reversal through FET 108. At block 212, after a time delay of PD, FET 108 is shut off and FET 110 is turned on. Current is now flowing from ground to phase 84. The process repeats itself starting again at block 200. The other phases would be controlled in a similar manner.

For example the phase delay (PD) could be accomplished by adjusting the comparator threshold Vth of comparators 148, 150, and 152. If the phase delay is accomplished by adjusting the comparator threshold values, the value of PD in FIG. 7 can be set to zero.

As any person skilled in the art of alternator design for automotive vehicles and other applications will recognize from the previous detailed description and from the figures and claims, modifications and changes can be made to the disclosed embodiments of the invention without departing from the scope of the invention defined by the following claims.

The invention claimed is:

1. A system for controlling the voltage output of an alternator, the system comprising:
   a rotor having a field winding;
   a stator having a plurality of phases, wherein the plurality of phases are magnetically coupled to the field winding;
   a rectifier bridge connected to the plurality of phases, wherein the rectifier bridge has a plurality of transistors for rectifying the alternating current developed in the plurality of stator phases;
   at least one detection circuit connected to the plurality of phases for sensing a current reversal in the plurality of stator phases; and
   a controller in communication with the at least one detection circuit and the rectifier bridge, wherein the controller includes a microprocessor having executable code for sequentially energizing and de-energizing the plurality of transistors when the at least one detection circuit has detected the reversal of the current in the stator phases.

2. The system of claim 1 wherein the at least one detection circuit is connected to a lead frame associated with each of the plurality of phases of the stator.

3. The system of claim 1 wherein the plurality of transistors are field effect transistors.

4. The system of claim 1 wherein the stator has three phases.

5. The system of claim 2 wherein the at least one detection circuit further comprises a plurality of amplifier circuits associated with each of the plurality of phases for amplifying the detected current in the lead frame.

6. The system of claim 2 wherein the plurality of comparator circuits is three comparator circuits.

7. The system of claim 5 wherein the plurality of amplifiers is three amplifiers.

8. The system of claim 5 wherein the at least one detection circuit further comprises a plurality of comparator circuits for comparing a voltage output signal generated by each of the plurality of amplifiers and that is proportional to the detected current to a predefined voltage threshold.

9. A method for controlling the voltage output of an alternator, the method comprising:
   rotating a rotor having a field winding;
   generating an alternating current in a plurality of phases of a stator, wherein the plurality of phases are magnetically coupled to the field winding;
   rectifying the alternating current developed in the plurality of stator phases using a rectifier bridge connected to the plurality of phases, wherein the rectifier bridge has a plurality of transistors;
   sensing a current reversal in each of the plurality of phases of the stator using at least one detection circuit connected to the plurality of phases; and
   sequentially energizing and de-energizing the plurality of transistors when the at least one detection circuit has detected the reversal of the current in the stator phases using a controller in communication with the at least one detection circuit and the rectifier bridge.

10. The method of claim 9 wherein sensing a current reversal further comprises sensing a current reversal in a lead frame associated with each of the plurality of phases of the stator.

11. The method of claim 10 further comprising amplifying the detected current in the lead frame using a plurality of amplifier circuits associated with each of the plurality of phases.

12. The method of claim 11 further comprising comparing a voltage output signal generated by each of the plurality of amplifiers to a predefined voltage threshold, wherein the voltage output signal is proportional to the detected current.

* * * * *